Feb. 11, 1964        H. BRUDNEY        3,120,720
DOLL'S EYE HAVING ENTERNAL LIGHT-DIFFUSING SURFACE
Filed July 17, 1961

INVENTOR.
HARRY BRUDNEY
BY
ATTORNEYS

United States Patent Office 3,120,720
Patented Feb. 11, 1964

3,120,720
DOLL'S EYE HAVING INTERNAL LIGHT-DIFFUSING SURFACE
Harry Brudney, New York, N.Y., assignor, by mesne assignments, to Jacoby-Bender, Inc., Woodside, N.Y., a corporation of New York
Filed July 17, 1961, Ser. No. 124,412
4 Claims. (Cl. 46—169)

This invention relates to doll's eyes and, more particularly, to a so-called "reflecting" eye such as is shown, for instance, in my United States Letters Patent No. 2,753,660, issued July 10, 1956.

A reflecting eye may be employed as a fixed, i.e. non-sleeping, eye, or in a sleeping eyeset, i.e. a pair of eyes joined for common oscillation, or as an individually movable eye, i.e. a single oscillatable eye which rotates independently of the other eye of a pair of eyes. By way of illustration my invention will be described hereinafter with respect to an individually movable eye, but it is to be understood that it is not so limited.

A reflecting eye is characterized by a lens, i.e. a body, of transparent material, e.g. a synthetic plastic resin, having a central pupil portion the back of which is so shaped and oriented that light rays entering the front of the lens will not be reflected thereby. The space in back of the lens is hollow and dark, having only a limited access to light, and the back wall thereof preferably is dark in color whereby the pupil appears to be black, as in a human eye, and for the same reason.

A reflecting eye further is characterized by an annular iris portion surrounding the central pupil portion, the back of the iris portion being so configured and oriented as to internally reflect light incident on the lens. Furthermore a reflecting eye usually includes a peripheral portion around the outer rim of the iris portion, the back of said peripheral portion being so contoured and oriented as not to reflect light incident on the lens whereby it, like the pubil portion, will appear to be dark.

It is the custom to shape the back of the annular iris portion so that it includes radial ribs between which lie radial serrations. Indeed all present-day commercial dolls' eyes have iris portions which entirely constitute such radial ribs or serrations. That is to say, the back surface of the iris portion of a current commercial reflecting eye entirely consists of these radial ribs or serrations. Such formation of the iris portion has been deliberately adopted in order to secure maximum internal reflectivity and brilliance in the iris of a doll's eye and represents an evolution from earlier constructions in which the radial ribs or serrations were spaced from one another by substantial amounts and intermediate constructions such as shown in my aforesaid Letters Patent wherein the radial ribs were quite close to one another.

Moreover it has been the custom for the purpose of securing peak efficiency of internal reflectivity to utilize what I may refer to as a "clean" serrated surface. This is a term which I employ to indicate that the individual components of the serrated surface, that is to say the sloping facets of the serrated surface, are individually highly finished, i.e. smooth, shiny and glassy. It is recognized that in molding it is not possible to secure an exact replica of a mold surface in a molded object. Nevertheless the molded object does, with a fair degree of faithfulness, duplicate the configuration of the mold and it is the custom for the facets of the mold, that is to say, the facets of the serrated surfaces in the mold which form the back of the iris, to be highly finished. These surfaces are ground and lapped to extreme smoothness so that if inspected visually they seem to be specular. Accordingly, the corresponding facets of the serrated iris surface in the finished eye which is cast in the mold cavity, e.g. by injection molding, are in turn extremely smooth.

I have discovered that the type of internal reflectivity consequent upon the use of smooth serrated surfaces in a doll's eye lends to the eye a very piercing, steely or glintin gappearance. In other words an eye so configured appears to be staring penetratingly at an observer and creates an uncomfortable almost eerie feeling although the reason for this has not heretofore been recognized. The effect created by such an eye is more consonant with the sharp look of a calculating adult rather than the innocuous gaze of an infant or young child and has, until the present time, been an inherent defect of doll's eyes.

It is an object of my invention to provide a novel doll's eye of the reflecting type which avoids the foregoing difficulties.

More particularly, it is an object of my invention to provide an improved reflecting doll's eye the iris of which has a softer, less glaring, less intense and more natural effect than heretofore.

It is another object of my invention to provide an improved reflecting doll's eye which has a soft although distinctly serrated iris.

Other objects of my invention in part will be obvious and in part will be pointed out hereinafter.

My invention accordingly consists in the features of construction, combination of elements, and arrangements of parts which will be exemplified in the doll's eye hereinafter described, and of which the scope of application will be indicated in the appended claims.

In the accompanying drawings, in which is shown one of the various possible embodiments of my invention, FIG. 1 is a vertical sectional view through a doll's eye the lens of which is constructed in accordance with my present invention;

Figure 1:
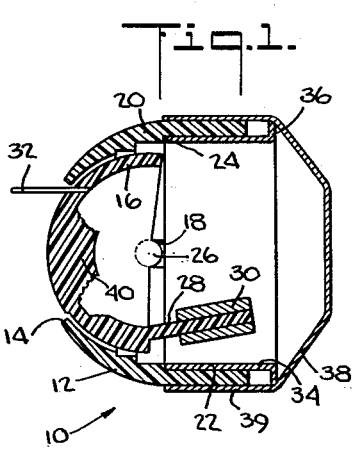

Referring now in detail to the drawings, the reference numeral 10 denotes an individual movable doll's eye assembly of standard construction, except for the lens, the same being of the type shown, for example, in my aforesaid Letters Patent 2,753,660.

The eye assembly includes a molded plastic socket 12 having a front opening 14 through which the eyeball 16 can be seen. The socket which functions as the front half of a casing for the eyeball is open at the rear thereof and is formed with a pair of rearwardly extending grooves 18 which run from the back of the front hemispherical section 20 of the socket to the rear rim of the front casing half. The rear section of the socket, which is of substantially cylindrical tubular shape, is recessed, as at 22, to provide an annular shoulder 24.

The eyeball is made, preferably by molding, of a transparent synthetic plastic material, e.g. cellulose acetate, cellulose acetate butyrate, or an acrylic resin. The plastic may be untinted; however I prefer to impart at least a slight tint thereto. In the absence of tinting the eye will seem to be grey. If a slight blue tint is provided, the eye will appear uncolored. If a heavier blue tint is used, the eye will appear to be blue. If a brown tint is provided the eye will appear to be brown. For tinting I employ standard transparent dyes which conventionally are used in the current fabrication of plastic reflecting doll's eyes.

The eyeball principally constitutes a hemispherical shell and also includes outwardly extending opposed diametrically registered trunnions 26 and a rearwardly extending lower tail 28. A suitable weight, e.g., a strip of lead 30, is secured as by clamping to the tail 28. Optionally an eyelash 32 also is provided, the same either being molded as an integral part of the eyeball or being inserted in a slit therein subsequent to molding of the eyeball.

The trunnions 26 are received and rotatable in the slots 18.

To retain the eyeball in place in the socket a ring of metal or plastic is utilized having a cylindrical portion 34 which is snugly accommodated in the recess 22 as far as the shoulder 24. Said ring has an outwardly extending annular flange portion 36 which is spaced from the back rim of the socket 20 as shown in FIG. 1. The cylindrical portion 34 reinforces the eye socket 20 as well as providing means for securely retaining the trunnions 26 in place.

The back of the eye socket is closed by a rear casing half 38 having a forwardly extending tubular portion 39 which is a snug fit on the outer surface of the rearwardly extending tubular section of the socket. Although not necessary, it is desirable that the inner portions of the casing which are in the line of sight through the pupil of the eyeball, be colored dark, e.g. black. These inner surfaces constitute the inner surface of the cylindrical portion 34 and the inner surface of the back of the rear casing half 38.

It will be appreciated that the construction of the doll's eye assembly as above described is entirely conventional and forms no part of my invention, having been detailed only in order to set forth the environment in which my invention is used. My invention resides in the physical configuration of the lens portion itself.

The lens portion, denoted by the reference numeral L, is at the center of the hemispherical part of the transparent eyeball and consists of a protuberant formation 40 on the rear surface. Said formation is approximately in the shape of the frustum of a cone. That is to say, the envelope (circumscribing shape) of the actual configuration of the protuberance is the frustum of a cone, although the specific geometric configuration of said formation does not include any true conic surface.

More specifically, the lens L includes an iris portion constituting a frustum of a multifaceted pyramid which is formed by providing a large number of slanted radial ribs 42 on the sides of the formation. The bases of the ribs are contiguous so that each adjacent pair of ribs defines a radial serration. Said ribs are of triangular cross-section (see FIG. 5) and, therefore, of prismatic contour with the apices 44 of the prisms constituting slant heights on the surface of the frustoconical envelope which may be considered to circumscribe the formation.

The sides 46 of each radial prismatic rib are symmetrically angularly disposed on opposite sides of the apex 44 included between them. The included angle between the pair of narrow side surfaces 46 forming a prismatic rib is about 90° so that light incident on the front of the lens L and internally striking the side surfaces 46 of a rib will be substantially totally internally reflected to strike the other side surface of the rib, then across to a narrow side surface of a diametrically opposed prismatic rib, then to the other side surface of said opposite rib and finally back out through the front of the lens. In this way the rear surface of the lens is shaped so as to act as light-gathering mechanism which will reflect back out substantially all of the light that strikes the narrow radial side surfaces of the formation whereby the sides of said frusto-pyramidal formation 40 will shine brightly by reflected light, the radial slanting apices 44 of the ribs and the radial slanting bases 48 of the serrations between the ribs being distinctly and clearly visible as discontinuities in the internally reflecting side surfaces so that the frusto-pyramidal formation is visible from the front of the lens as an annular illuminated iris zone having radiating lines corresponding to the apices 44 and the bases 48.

It will be observed that the bases of the prismatic ribs touch one another so that they substantially fill the annular front projections over which the ribs extend. Due to the internal substantially total reflecting arrangement of the narrow side surfaces 46 of the prismatic ribs, the lens is quite light, i.e. brilliant.

Figure 4:
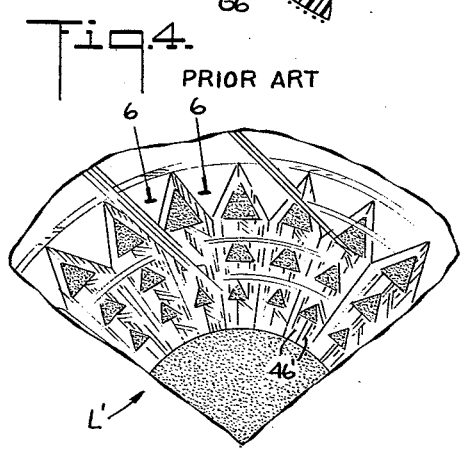
FIG. 4 is a view similar to FIG. 3 but showing a prior art lens by way of comparison with my new lens.
Figure 6:
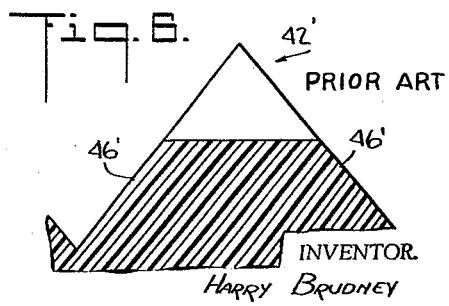
FIG. 6 is an enlarged sectional view taken substantially along the line 6—6 of FIG. 4 and showing the high degree of smoothness of the serrated surfaces of a prior art eye.

Because the eyes are made in great numbers they conventionally are fabricated by injection molding and for this purpose, of course, each eye is cast in a cavity so that it is a substantially faithful replica of the shape of the cavity. Heretofore, i.e. in the prior art, the lenses L' (see FIGS. 4 and 6) of reflection eyes had the side surfaces 46' of the prismatic iris ribs 42' highly finished, i.e. smooth, shiny and glassy, having been cast in a mold the corresponding surfaces of which were substantially highly finished and, therefore, specular. Due to this smoothness of the reflecting surfaces 46' in a prior art reflection eye such as shown in FIG. 4 the light entering the front of the eye and reflected by the surfaces 46' was reflected specularly, as from a mirror, or in other words the light reemerged from the front of the eye due to simple reflection between the side surfaces 46'. Each ray incident on the front of the eye was substantially faithfully reflected by each said surface 46' and ultimately emerged with very little distortion back out of the front of the eye. Such reflection was a hard reflection, that is to say, strong, precise and sharp because there was no appreciable dilution or distortion of the ray of light experienced as it travelled through the eye. There was a slight coloring due to the pigmentation or tinting of the plastic forming the eye. There also might have been a slight distortion, hardly noticeable, which could have been occasioned by nonconformity of the molded surface to the surface of the cavity. Nevertheless, all in all, because the reflection was so true the eye had a steely, staring, glinting, glaring, piercing, intense effect as can be seen by inspection of FIG. 4.

Figure 5:
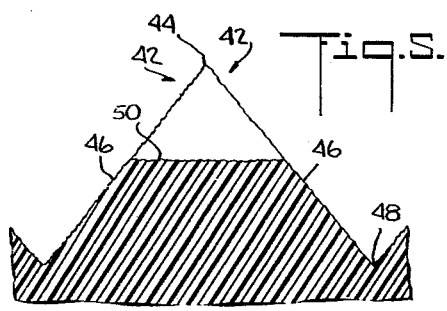
FIG. 5 is an enlarged sectional view taken substantially along the line 5—5 of FIG. 3 and showing to an exaggerated scale the slight roughening of the serrated surfaces.

My present invention avoids this drawback of prior reflection type eyes in a manner which is best shown in FIG. 5. As illustrated exaggeratedly therein, the narrow side surfaces 46 at the back of the iris portion of the plastic lens L are not smooth, i.e. highly finished, shiny and glossy as they have been heretofore. That is to say although the internally reflecting faceted surfaces still are substantially plane they are slightly roughened, i.e. uneven. The degree of roughtening has been exaggerated in FIG. 5 so that it can be seen. However the roughening is not to an extent that is tactilely noticeable. The roughening of these internally reflecting surfaces alternatively can be described as a satin finish or a frosted finish or a mat finish or as a diffuse finish or a dead or dull finish.

The desired aforesaid finish can be imparted to the surfaces 46 after molding as by grit blasting or the like. However such a method although possible is commercially infeasible. It is far simpler, and faster, and is far less costly, to roughen the back surface of the mold in which the eye is cast, i.e. injection molded. The said surface of the mold (corresponding to the back of the lens or the back of the eyeball) can be roughened in any well known fashion, as, for instance, by etching or air blasting or liquid blasting this latter process sometimes being referred to as vapor blasting. The blasting particles may be any well known abrasive material such for instance as sand, emery, metal, grit, silicon carbide or diamond dust. The mesh size of the particles can vary widely, e.g. from 40 to 5000 mesh. The carrier may, as indicated, either be gaseous or liquid, e.g. air or water.

It is emphasized that it is not necessary or even desirable to provide a severely roughened surface. All that is required is to destroy the highly smooth finish that normally is found in a mold and to substitute instead an irregular (lightly or mildly roughened) surface which will not faithfully reflect but rather will diffuse, i.e. spread, a light beam incident thereon. Any roughening of the mold surface which is sufficient to render said surface diffuse in its action upon incident light will impart a suitably roughened finish to the surfaces 46 of the eye. Accordingly, when an eye thus made, i.e. having such a finish at the back surface, is viewed from the front the internal reflecting facets will not provide a hard reflection of the light but rather will diffuse the light so that these surfaces as seen from the front will not seem to be steely and sharp but will have instead a soft appearance which is more natural for the innocent eye of a child.

If desired I may further reduce the intensity of the reflecting eye's glare by utilizing a construction such as shown in my copending application Serial No. 63,798, filed October 20, 1960, for Doll's Eyes. Pursuant thereto I provide various non-reflecting areas, i.e. islands, spots or flecks, at various parts of the frusto-conical iris portion of the formation 40. These islands are formed by including surfaces 50 of relatively small area (small with respect to the total iris area) on the back of the serrated sides of the formation 40 which surfaces 50 are approximately normal to the central optical axis, i.e. the axis of symmetry 52, of the lens portion L. Said axis likewise is the axis of symmetry of the frusto-conical envelope or, more exactly, of the frusto-pyramidal formation 40. It is not essential that said surfaces 50 be precisely 90° to the aforesaid axis of symmetry and indeed as illustrated said surfaces are inclined at an angle of 75°; however, in general it is to be observed that too great a deviation (more than about 60°) from perpendicularity is not desirable.

As noted above the surfaces 50 may be located anywhere at all within the annular iris area which is defined by the front projection of the frusto-pyramidal portion of the lens formation 40. For instance, any one of such surfaces may be located wholly within a single narrow side surface 46 of a rib or wholly within a single rib (including portions of both sides) or may bridge two or more ribs or may bridge one or more serrations. I have shown each surface 50 located wholly within a single prismatic rib, i.e. bridging the associated pairs of side surfaces 46 of a single rib.

More particularly, each prismatic rib 42 is formed with three such 75° substantially flat surfaces 50. Due to the symmetrical triangular cross-section of the prismatic ribs, the front projection of each surface 50 is an isosceles triangle 54. There are, by way of example, three such triangles formed in each prismatic rib. Inasmuch as in the eye shown all of the surfaces 50 are located at like distances away from the bases of the prismatic ribs and because the height of the prismatic ribs increase in a direction away from the center of the lens, the triangular islands 54 are progressively larger as their distance from the center of the lens increases. The side 56 of each triangle closest to the center of the lens is defined by the front projection of a wall 58 which is substantially parallel to the axis of symmetry 52 in order that the space in back of each of the islands 50 be left substantially unobstructed.

Due to the orientations of the island surfaces 50, i.e. less than 60° to the axis of symmetry 52, light entering the front of the lens will to a substantial degree not be reflected by the surfaces 50 but will pass on into the interior of the casing; accordingly, these surfaces 50 will appear to be black or dark and hence will give the effect of dark flecks in the otherwise substantially totally reflecting diffuse annular iris surface of the frusto-pyramidal formation 40 of the lens L.

The center of the annular frusto-pyramidal iris portion is a nonreflecting surface 60 which, as described in my issued United States Letters Patent 2,753,660, is rearwardly concave. However the specific contour of this surface is not a feature of my invention except that said surface 60 should be nonreflective; for example said surface may be flat or rearwardly convex or even painted a dark color although the latter is not necessary.

Figure 2:
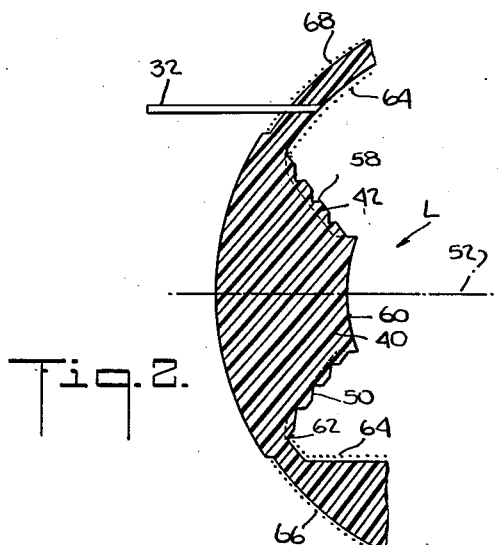
FIG. 2 is an enlarged fragmentary sectional view of the eyeball in the region of the lens.

The lens L may, if desired, further include a substantially flat annulus 62 peripherally circumscribing the large end (forward base) of the frusto-pyramidal formation 40. The surface of said annulus is at approximately 90° (less than 60°) to the axis of symmetry 52 so that this surface is nonreflecting. If said surface is left uncovered, i.e. unpainted, it will when viewed against a dark background, provide a dark ring around the iris of the doll's eye. However I prefer, in order to obtain a more realistic appearance, to coat said annulus 62 with paint, lacquer or the like of a desirable hue, e.g. of the same color as, but darker than, the tint imparted to the plastic lens. This layer of paint is indicated by the dotted line 64 in FIG. 2 and not only covers the annulus 62, but, for convenience, all of the interior surface of the eyeball, except the formation 40 which is protected, as by a mask, during the painting operation. The outer (front) surface of the eyeball radially outward of the formation 40 is painted a lighter color, the portion below the lens and up to the ends of the lash being painted white and being indicated by the dotted line 66, while the portion above the lens and ends of the lash is painted flesh color as indicated by the dotted line 68 to represent an eyelid.

It may be mentioned that when the back surface of the mold is roughened in the manner described above to frost the same, it is difficult although not impossible to protect the segments thereof used to shape the nonreflecting portions such for instance as the surface 50, 60 and 62 (when the latter is not painted). I have found however that because the roughening necessary to make the surfaces 46 diffusely reflecting is so slight (mild) it is not sufficient to render the surfaces 50, 60 and 62 opaque (reflective). Accordingly, the portions of the mold which form these latter surfaces may be left unshielded during the roughening of the back surface of the mold. The corresponding roughening of these surfaces in the eye leaves said surfaces nonreflective so that when viewed against a dark background they still appear to be black.

Figure 3:
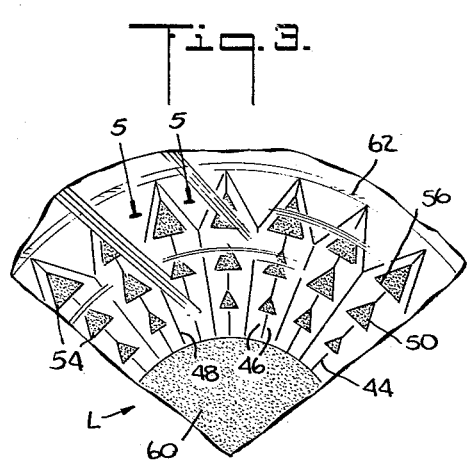
FIG. 3 is a fragmentary front view of my new lens as it appears when viewed against a dark background.

In FIG. 3 I have shown the lens as it appears when viewed from the front with the back surface thereof in front of a dark background. Under these circumstances the faceted surfaces 46 will diffusely reflect, i.e. softly reflect, light without imparting the hard glint from smooth faceted surfaces 46' such as shown in FIG. 4. However the islands 50 and the iris 60 are dark since no light is reflected therefrom and the viewer sees only the dark background behind the same. The annulus 62 if unpainted likewise will appear to be dark.

It thus will be seen that I have provided a doll's eye which achieves the several objects of this invention and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. For a reflecting doll's eye including an eyeball having a curved front surface and adapted to be mounted in front of a dark background, a lens of transparent material comprising a rearwardly extending rearwardly tapering frustrum including on the tapering back side thereof narrow, radially oriented, prismatically faceted surfaces rearwardly sloping at angles to the front surface sufficient to internally multiply reflect light which enters the eye through said front surface so that said light emerges from the eye through said front surface modulated so as to provide an image of said narrow, radially oriented, prismatically faceted surfaces, each of the facets being flat, said narrow, radially oriented, prismatically faceted surfaces having a mat finish to multiply diffusely reflect light and thereby soften said image of said narrow, radially oriented, prismatically faceted surfaces.

2. A lens as set forth in claim 1 wherein the narrow radially oriented, prismatically faceted surfaces define prismatic ribs.

3. A lens as set forth in claim 1 wherein the narrow radially oriented, prismatically faceted surfaces define prismatic serrations.

4. A lens as set forth in claim 1 wherein the narrow radially oriented, prismatically faceted surfaces define contiguous prismatic ribs.

References Cited in the file of this patent

UNITED STATES PATENTS

| | | |
|---|---|---|
| 1,762,933 | Mihalyi | June 10, 1930 |
| 1,763,312 | Marcus | June 10, 1930 |
| 2,238,008 | Beck et al. | Apr. 8, 1941 |
| 2,753,660 | Brudney | July 10, 1956 |

FOREIGN PATENTS

| | | |
|---|---|---|
| 522,860 | Italy | Apr. 12, 1955 |